US012217751B2

(12) United States Patent
Carbune et al.

(10) Patent No.: US 12,217,751 B2
(45) Date of Patent: Feb. 4, 2025

(54) DIGITAL SIGNAL PROCESSOR-BASED CONTINUED CONVERSATION

(71) Applicant: Google LLC, Mountain View, CA (US)

(72) Inventors: Victor Carbune, Zürich (CH); Matthew Sharifi, Kilchberg (CH)

(73) Assignee: Google LLC, Mountain View, CA (US)

(*) Notice: Subject to any disclaimer, the term of this patent is extended or adjusted under 35 U.S.C. 154(b) by 389 days.

(21) Appl. No.: 17/644,394

(22) Filed: Dec. 15, 2021

(65) Prior Publication Data

US 2023/0113883 A1    Apr. 13, 2023

Related U.S. Application Data

(60) Provisional application No. 63/262,447, filed on Oct. 13, 2021.

(51) Int. Cl.
*G10L 15/22* (2006.01)
*G06F 16/9032* (2019.01)
(Continued)

(52) U.S. Cl.
CPC ........ *G10L 15/22* (2013.01); *G06F 16/90332* (2019.01); *G10L 15/26* (2013.01); *G10L 25/78* (2013.01)

(58) Field of Classification Search
CPC ......... G10L 15/22; G10L 15/26; G10L 25/78; G10L 2015/223; G10L 15/28;
(Continued)

(56) References Cited

U.S. PATENT DOCUMENTS

| 2014/0075226 A1* | 3/2014 | Heo ............... G06F 1/3215 713/323 |
| 2014/0222436 A1* | 8/2014 | Binder ............. G10L 15/26 704/275 |

(Continued)

FOREIGN PATENT DOCUMENTS

WO    2020135811 A1    7/2020

OTHER PUBLICATIONS

Priyantha, B., Lymberopoulos, D., & Liu, J. (2011). Littlerock: Enabling energy-efficient continuous sensing on mobile phones. IEEE Pervasive Computing, 10(2), 12-15. (Year: 2011).*

(Continued)

*Primary Examiner* — Bhavesh M Mehta
*Assistant Examiner* — Philip H Lam
(74) *Attorney, Agent, or Firm* — Honigman LLP; Brett A. Krueger; Grant Griffith

(57) ABSTRACT

A method includes instructing an always-on first processor to operate in a follow-on query detection mode, and while the always-on first processor operates in the follow-on query detection mode: receiving follow-on audio data captured by the assistant-enabled device; determining, using a voice activity detection (VAD) model executing on the always-on first processor, whether or not the VAD model detects voice activity in the follow-on audio data; performing, using a speaker identification (SID) model executing on the always-on first processor, speaker verification on the follow-on audio data to determine whether the follow-on audio data includes an utterance spoken by the same user. The method also includes initiating a wake-up process on a second processor to determine whether the utterance includes a follow-on query.

30 Claims, 8 Drawing Sheets

(51) Int. Cl.
*G10L 15/26* (2006.01)
*G10L 25/78* (2013.01)

(58) Field of Classification Search
CPC ..... G10L 15/30; G10L 17/06; G10L 15/1822; G10L 2015/088; G06F 16/90332; G06F 3/167
See application file for complete search history.

(56) References Cited

U.S. PATENT DOCUMENTS

| | | |
|---|---|---|
| 2014/0249817 A1 | 9/2014 | Hart et al. |
| 2016/0180837 A1* | 6/2016 | Gustavsson ............. G06F 3/167 |
| | | 704/251 |
| 2018/0158462 A1* | 6/2018 | Page ....................... G10L 17/00 |
| 2019/0230458 A1* | 7/2019 | Rand ...................... G10L 15/22 |
| 2019/0371343 A1* | 12/2019 | Tukka ..................... G10L 15/22 |
| 2020/0219517 A1* | 7/2020 | Wang ..................... G10L 17/18 |
| 2020/0365155 A1* | 11/2020 | Milden ................... G06F 3/167 |
| 2021/0256980 A1* | 8/2021 | George-Svahn ....... G06V 40/19 |
| 2021/0327436 A1* | 10/2021 | Zheng .................... G06F 3/167 |
| 2022/0093105 A1* | 3/2022 | Choi ....................... G10L 15/32 |

OTHER PUBLICATIONS

International Search Report (ISR) and Written Opinion (WO) for the related PCT Application No. PCT/US2021/063470, dated Jun. 10, 2022, 82 pages.

\* cited by examiner

DIGITAL SIGNAL PROCESSOR-BASED CONTINUED CONVERSATION

CROSS-REFERENCE TO RELATED APPLICATIONS

This U.S. patent application claims priority under 35 U.S.C. § 119(e) to U.S. Provisional Application 63/262,447, filed on Oct. 13, 2021. The disclosure of this prior application is considered part of the disclosure of this application and is hereby incorporated by reference in its entirety.

TECHNICAL FIELD

This disclosure relates to digital signal processor-based continued conversation.

BACKGROUND

A speech-enabled environment (e.g., home, workplace, school, automobile, etc.) allows a user to speak a query or a command out loud to a computer-based system that fields and answers the query and/or performs a function based on the command. The speech-enabled environment can be implemented using a network of connected microphone devices distributed through various rooms or areas of the environment. The devices may operate in a sleep state and initiate a wake-up process to perform speech recognition on an utterance directed to the system in response to detecting a hotword spoken by the user that precedes the utterance. The user may speak follow-on queries or commands after receiving the answer fielded by the computer-based system. Requiring the user to speak the hotword for each subsequent follow-on query or command is as much tiresome for the user as it is unnatural.

SUMMARY

One aspect of the disclosure provides a computer-implemented that when executed on data processing hardware of an assistant-enabled device causes the data processing hardware to perform operations that include, in response to receiving a response to an initial query submitted by a user of the assistant-enabled device to a digital assistant, instructing an always-on first processor of the data processing hardware to operate in a follow-on query detection mode. While the always-on first processor operates in the follow-on query detection mode, the operations also include: receiving, at the always-on first processor, follow-on audio data captured by the assistant-enabled device in an environment of the assistant-enabled device; determining, using a voice activity detection (VAD) model executing on the always-on first processor, whether or not the VAD model detects voice activity in the follow-on audio data; performing, using a speaker identification (SID) model executing on the always-on first processor, speaker verification on the follow-on audio data to determine whether the follow-on audio data includes an utterance spoken by the same user that submitted the initial query to the digital assistant; and when the VAD model detects voice activity in the follow-on audio data and the follow-on audio data includes the utterance spoken by the same user that submitted the initial query, initiating a wake-up process on a second processor of the data processing hardware to determine whether the utterance includes a follow-on query directed toward the digital assistant.

Implementations of the disclosure may include one or more of the following optional features. In some implementations, instructing the always-on first processor of the data processing hardware to operate in the follow-on query detection mode causes the always-on first processor to initiate execution of the VAD and SID models on the always-on first processor during operation in the follow-on query detection mode. In additional implementations, instructing the always-on first processor of the data processing hardware to operate in the follow-on query detection mode causes the always-on first processor to disable a hotword detection model during operation in the follow-on query detection mode. The SID model may include a text-independent SID model configured to extract a text-independent speaker-discriminative vector from the follow-on audio data.

In some examples, initiating the wake-up process on the second processor causes the second processor to perform operations that include processing the follow-on audio data to generate a transcription of the utterance spoken by the same user that submitted the initial query and performing query interpretation on the transcription to determine whether or not the utterance includes the follow-on query directed toward the digital assistant. Here, when the utterance includes the follow-on query directed toward the digital assistant, the operations may further include: instructing the digital assistant to perform an operation specified by the follow-on query; receiving, from the digital assistant, a follow-on response indicating performance of the operation specified by the follow-on query; and presenting, for output from the assistant-enabled device, the follow-on response.

In other examples, initiating the wake-up process on the second processor causes the second processor to transmit the follow-on audio data to a remote server via a network. In these examples, the follow-on audio data when received by the remote server causing the remote server to perform operations that include: processing the follow-on audio data to generate a transcription of the utterance spoken by the same user that submitted the initial query; performing query interpretation on the transcription to determine whether or not the utterance includes the follow-on query directed toward the digital assistant; and when the utterance includes the follow-on query directed toward the digital assistant, instructing the digital assistant to perform an operation specified by the follow-on query. Furthermore, after instructing the digital assistant to perform the operation specified by the follow-on query in these examples, the operations may further include: receiving, from the digital assistant, a follow-on response indicating performance of the operation specified by the follow-on query; and presenting, for output from the assistant-enabled device, the follow-on response.

In some implementations, the operations also include, after receiving initial audio data corresponding to the initial query spoken by the user and submitted to the digital assistant, extracting, from the initial audio data, a first speaker-discriminative vector representing characteristics of the initial query spoken by the user. In these implementations, performing speaker verification on the follow-on audio data includes: extracting, from the follow-on audio data, using the SID model, a second speaker-discriminative vector representing characteristics of the follow-on audio data; and determining that the follow-on audio data includes the utterance spoken by the same user that submitted the initial query to the digital assistant when the first speaker-discriminative vector matches the second speaker-discriminative vector.

In some additional implementations, the operations also include, after receiving initial audio data corresponding to the initial query spoken by the user and submitted to the digital assistant: extracting, from the follow-on audio data, using the SID model, a second speaker-discriminative vector representing characteristics of the follow-on audio data; determining that the follow-on audio data includes the utterance spoken by the same user that submitted the initial query to the digital assistant when the first speaker-discriminative vector matches the second speaker-discriminative vector; and when the first speaker-discriminative vector matches one of the enrolled speaker vectors, identifying the user that spoke the initial query as the respective enrolled user associated with the one of the enrolled speaker vectors that matches the first speaker-discriminative vector. In these additional implementations, performing speaker verification on the follow-on audio data includes: extracting, from the follow-on audio data, using the SID model, a second speaker-discriminative vector representing characteristics of the follow-on audio data; and determining that the follow-on audio data includes the utterance spoken by the same user that submitted the initial query to the digital assistant when the second speaker-discriminative vector matches the one of the enrolled speaker vectors associated with the respective enrolled user that spoke the initial query.

In some examples, the operations further include, in response to determining at least one of the VAD model failing to detect voice activity in the follow-on audio data or the follow-on audio data fails to include an utterance spoken by the same user that submitted the initial query, instructing the always-on first processor to cease operating in the follow-on query detection mode and commence operating in a hotword detection mode. Here, instructing the always-on first processor to commence operating in the hotword detection mode may cause the always-on first processor to initiate execution of a hotword detection model on the always-on first processor. Additionally or alternatively, instructing the always-on first processor to cease operating in the follow-on query detection mode may cause the always-on first processor to disable or deactivate execution of the VAD and SID models on the always-on first processor.

The always-on first processor may include a digital signal processor and the second processor may include an application processor. The assistant-enabled device may include a battery-powered device in communication with one or more microphones configured to capture the follow-on audio data and initial audio data corresponding to the initial query.

Another aspect of the disclosure provides a system that includes data processing hardware and memory hardware in communication with the data processing hardware. The memory hardware stores instructions that when executed on the data processing hardware causes the date processing hardware to perform operations that include that include that include, in response to receiving a response to an initial query submitted by a user of the assistant-enabled device to a digital assistant, instructing an always-on first processor of the data processing hardware to operate in a follow-on query detection mode. While the always-on first processor operates in the follow-on query detection mode, the operations also include: receiving, at the always-on first processor, follow-on audio data captured by the assistant-enabled device in an environment of the assistant-enabled device; determining, using a voice activity detection (VAD) model executing on the always-on first processor, whether or not the VAD model detects voice activity in the follow-on audio data; performing, using a speaker identification (SID) model executing on the always-on first processor, speaker verification on the follow-on audio data to determine whether the follow-on audio data includes an utterance spoken by the same user that submitted the initial query to the digital assistant; and when the VAD model detects voice activity in the follow-on audio data and the follow-on audio data includes the utterance spoken by the same user that submitted the initial query, initiating a wake-up process on a second processor of the data processing hardware to determine whether the utterance includes a follow-on query directed toward the digital assistant.

This aspect may include one or more of the following optional features. In some implementations, instructing the always-on first processor of the data processing hardware to operate in the follow-on query detection mode causes the always-on first processor to initiate execution of the VAD and SID models on the always-on first processor during operation in the follow-on query detection mode. In additional implementations, instructing the always-on first processor of the data processing hardware to operate in the follow-on query detection mode causes the always-on first processor to disable a hotword detection model during operation in the follow-on query detection mode. The SID model may include a text-independent SID model configured to extract a text-independent speaker-discriminative vector from the follow-on audio data.

In some examples, initiating the wake-up process on the second processor causes the second processor to perform operations that include processing the follow-on audio data to generate a transcription of the utterance spoken by the same user that submitted the initial query and performing query interpretation on the transcription to determine whether or not the utterance includes the follow-on query directed toward the digital assistant. Here, when the utterance includes the follow-on query directed toward the digital assistant, the operations may further include: instructing the digital assistant to perform an operation specified by the follow-on query; receiving, from the digital assistant, a follow-on response indicating performance of the operation specified by the follow-on query; and presenting, for output from the assistant-enabled device, the follow-on response.

In other examples, initiating the wake-up process on the second processor causes the second processor to transmit the follow-on audio data to a remote server via a network. In these examples, the follow-on audio data when received by the remote server causing the remote server to perform operations that include: processing the follow-on audio data to generate a transcription of the utterance spoken by the same user that submitted the initial query; performing query interpretation on the transcription to determine whether or not the utterance includes the follow-on query directed toward the digital assistant; and when the utterance includes the follow-on query directed toward the digital assistant, instructing the digital assistant to perform an operation specified by the follow-on query. Furthermore, after instructing the digital assistant to perform the operation specified by the follow-on query in these examples, the operations may further include: receiving, from the digital assistant, a follow-on response indicating performance of the operation specified by the follow-on query; and presenting, for output from the assistant-enabled device, the follow-on response.

In some implementations, the operations also include, after receiving initial audio data corresponding to the initial query spoken by the user and submitted to the digital assistant, extracting, from the initial audio data, a first speaker-discriminative vector representing characteristics of the initial query spoken by the user. In these implementations, performing speaker verification on the follow-on audio data includes: extracting, from the follow-on audio data, using the SID model, a second speaker-discriminative vector representing characteristics of the follow-on audio data; and determining that the follow-on audio data includes the utterance spoken by the same user that submitted the initial query to the digital assistant when the first speaker-discriminative vector matches the second speaker-discriminative vector.

In some additional implementations, the operations also include, after receiving initial audio data corresponding to the initial query spoken by the user and submitted to the digital assistant: extracting, from the follow-on audio data, using the SID model, a second speaker-discriminative vector representing characteristics of the follow-on audio data; determining that the follow-on audio data includes the utterance spoken by the same user that submitted the initial query to the digital assistant when the first speaker-discriminative vector matches the second speaker-discriminative vector; and when the first speaker-discriminative vector matches one of the enrolled speaker vectors, identifying the user that spoke the initial query as the respective enrolled user associated with the one of the enrolled speaker vectors that matches the first speaker-discriminative vector. In these additional implementations, performing speaker verification on the follow-on audio data includes: extracting, from the follow-on audio data, using the SID model, a second speaker-discriminative vector representing characteristics of the follow-on audio data; and determining that the follow-on audio data includes the utterance spoken by the same user that submitted the initial query to the digital assistant when the second speaker-discriminative vector matches the one of the enrolled speaker vectors associated with the respective enrolled user that spoke the initial query.

In some examples, the operations further include, in response to determining at least one of the VAD model failing to detect voice activity in the follow-on audio data or the follow-on audio data fails to include an utterance spoken by the same user that submitted the initial query, instructing the always-on first processor to cease operating in the follow-on query detection mode and commence operating in a hotword detection mode. Here, instructing the always-on first processor to commence operating in the hotword detection mode may cause the always-on first processor to initiate execution of a hotword detection model on the always-on first processor. Additionally or alternatively, instructing the always-on first processor to cease operating in the follow-on query detection mode may cause the always-on first processor to disable or deactivate execution of the VAD and SID models on the always-on first processor.

The always-on first processor may include a digital signal processor and the second processor may include an application processor. The assistant-enabled device may include a battery-powered device in communication with one or more microphones configured to capture the follow-on audio data and initial audio data corresponding to the initial query.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
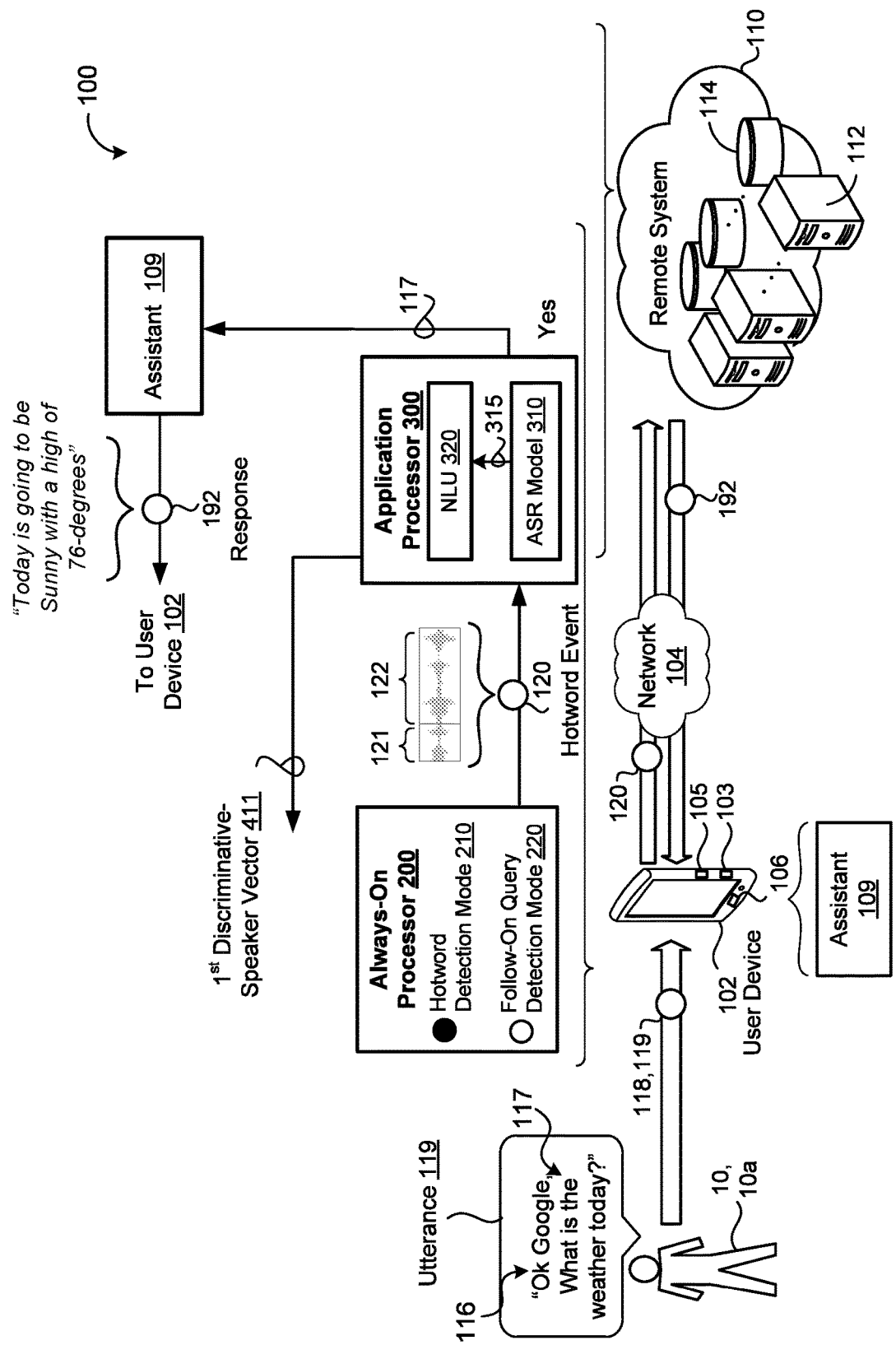
FIGS. 1A and 1B are schematic views of an example assistant-enabled device detecting continued conversation in a speech-enabled environment.

Speech-based interfaces such as digital assistants are becoming increasingly prevalent across a variety of devices including, without limitation, mobile phones and smart speakers/displays that include microphones for capturing speech. The general way of initiating voice interaction with an assistant-enabled device (AED) is to speak a fixed phrase, e.g., a hotword, that when detected by the AED in streaming audio, triggers the AED to initial a wake-up process to begin recording and processing subsequent speech to ascertain a query spoken by the user. Thus, the hotword is an important component in the overall digital assistant interface stack as it allows users to wake up their AEDs from a low power state to a high power state so that the AEDs can proceed to perform more expensive processing such as full automated speech recognition (ASR) or server-based ASR.

Often times, users have follow up queries after receiving a response to an initial query. For instance, a user may speak an initial query "who was the thirty-ninth President of the United States?" to an AED that returns a response "Jimmy Carter" to the user. Thereafter, the user may direct a follow-on query of "How old is he?" to the AED. Here, a continued conversation, or follow-on, query mode keeps the AED in the high power state for a predefined amount of time after providing the response by leaving the microphone open and running the ASR to process any speech to determine whether any of the subsequent speech is intended towards the AED. After the predefined amount of time has expired, the AED returns to the low power state. Leaving the AED in the high power state for the predefined amount of time, however, consumes a significant amount of computational resources and battery power. Moreover, speech that is not intended for the AED may be captured (and then deleted) during the predefined amount of time while the AED is in the higher power state. Thus, it would be advantageous for AEDs to return to the low power state after providing the response to the initial query while still being able to detect any follow-on queries directed towards the AED that do not include a hotword.

Accordingly, implementations herein are directed towards a method of processing follow-on queries while remaining in a low power state. In particular, a user submits an initial query including a hotword and a query to an AED having an always-on digital signal processor (DSP) operating in a hotword detection mode. When the DSP operating the hotword detection mode detects a hotword in the initial query, the DSP initiates a wake-up process on a second processor to perform more expensive processing such as full ASR to provide a response to the initial query. The second processor may include an application processor (AP) or other type of system-on-a-chip (SoC) processor.

In response to receiving the response to the initial query, the AED instructs the always-on DSP to operate in a follow-on query detection mode to detect any follow-on queries from the user that submitted the initial query. Here, the DSP receives follow-on audio data and determines whether voice activity exists and whether the follow-on audio data includes an utterance spoken by a same user that submitted the initial query. When the first processor detects voice activity and the same user that submitted the initial query, the first processor (i.e., always-on DSP) initiates a wake-up process on the second processor to perform the more expensive processing such as full ASR or server-based ASR to provide a response to the follow-on query. Accordingly, while the DSP operates in the follow-on query detection mode, the AED is consuming significantly less computational resources and battery power than if the second processor were active and running ASR, while still having the capability to detect follow-on queries spoken by the same user that do not include a hotword. The DSP will only trigger activation of the second processor to initiate ASR if a follow-on query spoken by the same user is detected by the DSP. Otherwise, when no follow-on query is spoken by the same user, the AED will remain in the lower power state and transition the DSP to operate in the hotword detection mode after a predetermined amount of time and only trigger the wake-up process if the presence of the hotword is detected in streaming audio data.

Figure 1B:
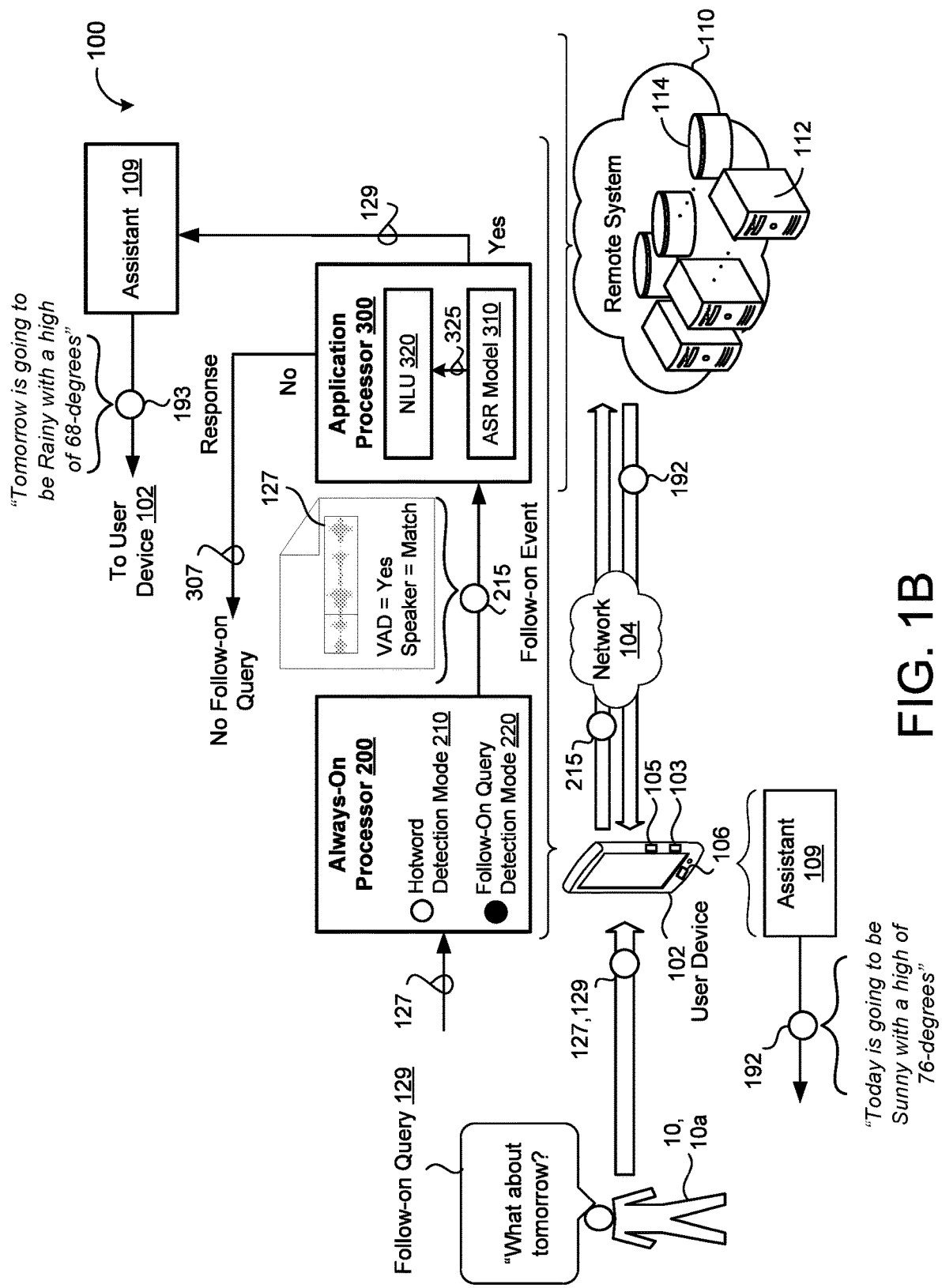

Referring to FIGS. 1A and 1B, in some implementations, an example system 100 includes an AED (i.e., user device) 102 associated with one or more users 10 and in communication with a remote system 110 via a network 104. The AED 102 may correspond to a computing device, such as a mobile phone, computer (laptop or desktop), tablet, smart speaker/display, smart appliance, smart headphones, wearable, vehicle infotainment system, etc., and is equipped with data processing hardware 103 and memory hardware 105. The AED 102 includes or is in communication with one or more microphones 106 for capturing streaming audio 118 in the environment of the AED 102 that may include utterances 119, 129 spoken by the respective user 10. The remote system 110 may be a single computer, multiple computers, or a distributed system (e.g., a cloud environment) having scalable/elastic computing resources 112 (e.g., data processing hardware) and/or storage resources 114 (e.g., memory hardware).

The data processing hardware 103 of the AED 102 includes a first processor 200 and a second processor 300. As used herein, the first processor 200 includes an always-on DSP 200 (also referred to as DSP 200) that is configured to detect the presence of hotword(s) 116 and/or follow-on queries in streaming audio 118 without performing semantic analysis or speech recognition processing on the streaming audio 118. The DSP 200 may receive the streaming audio 118 including the acoustic features extracted by an acoustic feature extractor from an utterance 119 spoken by a user 10, 10a. As used herein user 10a refers to the user 10a that spoke the initial utterance 119. The DSP (i.e., first processor) 200 may operate in a hotword detection mode (FIG. 1A) 210 and a follow-on query detection mode (i.e., follow-on mode) (FIG. 1B) 220. In some examples, due to storage/memory/processing constraints, the DSP 200 only operates in one of the hotword detection mode or the follow-on query detection mode at a time. That is, in these examples, either the hotword detection mode 210 is enabled and the follow-on detection mode 220 is disabled or the hotword detection mode 210 is disabled and the follow-on detection mode 220 is enabled. In other examples, however, operation of the DSP 200 in the hotword detection mode 210 remains enabled while the DSP 200 simultaneously operates in the follow-on query detection mode. As will become apparent, the always-on processor 200 may operate in the hotword detection mode 210 and/or the follow-on query detection mode 220 while the AED 102 is in a low power state and the second processor 300 is asleep. The second processor may include an application processor (AP) or another type of system-on-a-chip (SoC) processor that consumes more power than the always-on DSP when the second processor is awake.

Referring now to FIG. 1A, in some implementations, the always-on DSP 200 operates in the hotword detection mode 210 while the follow-on query detection mode 220 is disabled and the second processor 300 is asleep. During operation in the hotword detection mode 210, the DSP 200 is configured to detect the presence of the hotword 116 "Ok Google" in streaming audio 118 to initiate a wake-up process on the second processor 300 for processing the hotword 116 and/or an initial query 117 following the hotword 116 in the streaming audio 118. In the example shown, the utterance 119 includes the hotword 116, "Ok Google", followed by an initial query 117, "What is the weather today?" The AED 102 may extract acoustic features from the streaming audio 118 and store the extracted acoustic features in a buffer of the memory hardware 105 for use in detecting whether or not the streaming audio 118 includes the presence of the hotword 116. The DSP 200 may execute a hotword detection model configured to generate a probability score that indicates a presence of the hotword 116 in the acoustic features of the streaming audio 118 captured by the AED 102, and detect the hotword 116 in the streaming audio 118 when the probability score satisfies a hotword detection threshold. The DSP 200 may include multiple hotword detection models each trained to detect a different hotword associated with a particular term/phrase. These hotwords may be predefined hotwords and/or custom hotwords assigned by the user 10. In some implementations, the hotword detection mode includes a trained neural network-based model received from the remote system 110 via the network 104.

In the example shown, the DSP 200 may determine that the utterance 119 "Ok Google, what is the weather today" includes the hotword 116 "Ok Google" when the DSP 200 detects acoustic features in the streaming audio 118 that are characteristic of the hotword 116. For example, the DSP 200 may detect that the utterance 119 "Ok Google, what is the weather today?" includes the hotword 116 "Ok Google" based on generating MFCCs from the audio data and classifying that the MFCCs include MFCCs that are similar to MFCCs that are characteristic of the hotword "Ok Google" as stored in a hotword detection model. As another example, DSP 200 may detect that the utterance 119 "Ok Google, What is the weather today" Includes the hotword 116 "Ok Google" based on generating mel-scale filterbank energies from the audio data and classifying that the mel-scale filterbank energies include mel-scale filterbank energies that are similar to mel-scale filterbank energies that are characteristic of the hotword "OK Google" as stored in the hotword detection model.

In response to detecting the presence of the hotword 116 in the streaming audio 118 corresponding to the utterance 119 spoken by the user 10a, the DSP 200 provides audio data 120 characterizing the hotword event to initiate a wake-up process on the second processor 300 for confirming the presence of the hotword 116. The audio data (interchangeably referred to as hotword event) 120 includes a first portion 121 characterizing the hotword 116 and a second portion 122 characterizing the initial query 117. Here, the second processor 300 may execute a more robust hotword detection model to confirm whether the audio data 120 includes the hotword 116. Additionally or alternatively, the second processor 300 may execute speech recognition on the audio data 120 via an automatic speech recognition (ASR) model 310 to confirm whether the audio data 120 includes the hotword.

When the second processor 300 confirms that the audio data 120 includes the hotword 116, the second processor 300 may execute the ASR model 310 to process the audio data 120 to generate a speech recognition result 315 and execute a natural language understanding (NLU) module 320 to perform semantic interpretation on the speech recognition result to determine that the audio data 120 includes the initial query 117 for a digital assistant 109 to perform an operation. In this example, the ASR model 310 may process the audio data 120 to generate a speech recognition result 315 for "What is the weather today" that the NLU module 320 may identify as the initial query 117 for the digital assistant 109 to perform the operation of fetching a response 192 (i.e., answer to the initial query 117) that indicates "Today is going to be Sunny with a high of 76-degrees". The digital assistant 109 may provide the response 192 for output from the AED 102. For instance, the digital assistant 109 may audibly output the response 192 from the AED 102 as synthesized speech and/or display a textual representation of the response 192 on a screen of the AED 102.

In some implementations, the ASR model 310 and NLU module 320 are located on the remote system 110 in addition to, or in lieu of, the AED 102. Upon the DSP 200 triggering the second processor 300 to wake-up responsive to detecting the hotword 116 in the utterance 119, the second processor may transmit the audio data 120 corresponding to the utterance 119 to the remote system 110 via the network 104. The AED 102 may transmit the first portion 121 of the audio data 120 that includes the hotword 116 for the remote system 110 to confirm the presence of the hotword 116 performing speech recognition via the ASR model 310. Alternatively, the AED 102 may transmit only the second portion 122 of the audio data 120 that corresponds to the initial query 117 spoken in utterance 119 after the hotword 116 to the remote system 110. The remote system 110 executes the ASR model 310 to generate the speech recognition result 315 for the audio data 120. The remote system 110 may also execute the NLU module 320 to perform semantic interpretation on the speech recognition result 315 to identify the initial query 117 for the digital assistant 109 to perform the operation. Alternatively, the remote system 110 may transmit the speech recognition result 315 to the AED 102 and the AED 102 may execute the NLU module 320 to identify the initial query 117.

The digital assistant 109 may be located on the remote system 110 and/or the AED 102. The digital assistant 109 is configured to perform the operation specified by the initial query 117 from the second processor 300. In some examples, the digital assistant 109 accesses a search engine to fetch the response 192 associated with the initial query 117. In other examples, the digital assistant 109 accesses memory hardware 105 of the AED 102 and/or the memory hardware 114 of the remote system to fetch the response 192 associated with the initial query 117. Alternatively, the digital assistant 109 performs an operation associated with the initial query 117 (i.e., "call mom").

In some implementations, the user 10a has a follow-on query based on the response 192 to the initial query 117. That is, after receiving the response 192 that "today is going to be sunny with a high of 76-degrees," the user 10a may have a follow-on query inquiring about the weather tomorrow. Current techniques allow for users to provide follow-on queries without requiring the user to re-speak the hotword by keeping the second processor 300 awake to process all of the audio data that follows the initial query 117 for a predetermined amount of time before returning to the sleep state. That is, the second processor 300 may continuously perform speech recognition and/or semantic interpretation on all subsequent audio data to determine whether the user submitted a follow-on query for the digital assistant 109 to perform an operation. While this technique is effective for recognizing follow-on queries spoken in utterances that do not contain hotwords, requiring the second processor 300 to remain awake and continuously process all incoming audio data is computationally expensive and consumes battery power. Notably, the computational expense and consumption of battery power is especially wasteful in the majority of instances where the user 10a does not submit a follow-on query.

In some implementations, the second processor 300 determines a first discriminative-speaker vector 411. The first discriminative-speaker vector 411 represents speech characteristics of the user 10a that spoke the utterance 119. The AED 102 may store the first discriminative-speaker vector 411 in the memory hardware 105 and/or the remote system 100 may store the first discriminative-speaker vector 411 in the storage resources 114. Thereafter, as will become apparent, the first discriminative-speaker vector 411 may be obtained to identify whether a user that speaks a follow-on query is the same as the user 10a that spoke the initial query 117.

Referring now to FIG. 1B, in response to receiving the response 192 to the initial query 117 submitted by the user 10a, the digital assistant 109 instructs the DSP 200 to operate in the follow-on query detection mode 220. Here, instructing the DSP 200 to operate in the follow-on detection mode 220 may cause the hotword detection mode 210 to disable and/or the second processor (e.g., AP) 300 to return to the sleep state. The second processor 300 may automatically return to the sleep state once the response 192 is output from the AED 102. The DSP 200, while operating in the follow-on detection mode 220, receives follow-on audio data 127 corresponding to a follow-on query 129 spoken by the user 10a and captured by the AED 102. In the example shown, the user 10a speaks the follow-on query 129 "What about tomorrow?" in response to the AED 102 providing the user 10a the response 192 "Today is going to be sunny with a high of 76-degrees." Notably, the user 10a simply speaks the follow-on query 129 without speaking the hotword 116 a second time as the user 10a when speaking the initial utterance 119 in FIG. 1A. However, in some other examples, the follow-on query 129 includes a hotword 116.

Figure 2:
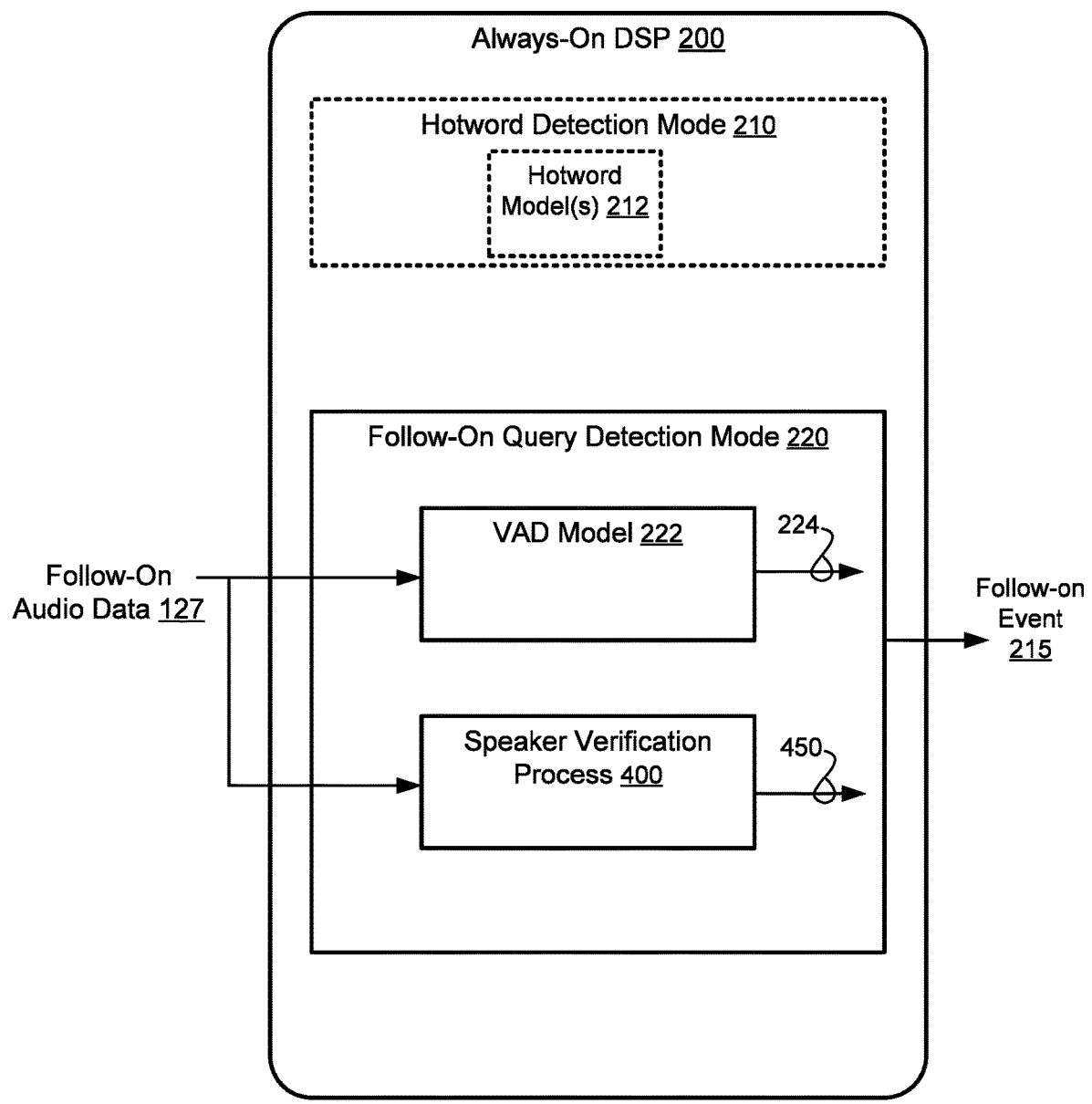
FIG. 2 is a schematic view of a digital signal processor executing on the assistant-enabled device of FIGS. 1A and 1B.

With reference to FIGS. 1B and 2, during operation in the follow-on query detection mode 220, the DSP 200 executes a voice activity detection (VAD) model 222 and a speaker verification process 400. The VAD model 222 may be a model trained to determine whether or not voice activity is present in the follow-on audio data 127. That is, the VAD model 222 determines whether the follow-on audio data 127 includes voice activity, such as speech spoken by a human, or includes non-voice activity audio (i.e., stereo, speakers, background noise, etc.). The VAD model 222 may be trained to output a voice activity score 224 that indicates a likelihood that the follow-on audio data 127 includes voice activity. Here, the DSP 200 may determine that the follow-on audio data 127 includes voice activity when the voice activity score 224 satisfies a voice activity threshold. In some examples, the VAD model 222 outputs a binary voice activity indication, where "1" denotes "Yes" and "0" denotes "No" indicating that the follow-on audio data 127 does ("Yes") or does not ("No") include voice activity. The VAD model 222 may be trained to distinguish human speech from synthetic/synthesized speech. The DSP 200 may be configured to operate as state machine based on activity of arbitrary models, e.g., the VAD model 222, speaker verification process 400, hotword detection model(s). For instance, models A, B, C may be active while the DSP is in state 0, and when model A triggers, the DSP may transition to state 1 where models B, D are now active. The state-machine could be learned based on model outputs, user feedback, or pre-programmed.

The DSP 200 executes the speaker verification process 400 to determine a verification result 450 indicating whether the follow-on audio data 127 includes an utterance spoken by the same user 10a that submitted the initial query 117. In some examples, to preserve computing and battery power, execution of the speaker verification process 400 is conditioned on the VAD model 222 first detecting voice activity. When the VAD model 222 detects (i.e., based on the voice activity score 224) voice activity in the follow-on audio data 127 and the verification result 450 output by the speaker verification process 400 determines the follow-on audio data 127 includes an utterance spoken by the same user 10a that submitted the initial query 117, the DSP 200 provides a follow-on event 215 to the second processor 300 configured to cause the second processor 300 to wake-up from the sleep state. Here, the follow-on event includes the follow-on audio data 127, whereby the second processor 300 (e.g., application processor/CPU) awakes to determine whether the follow-on audio data 127 includes the follow-on query 129 specifying a subsequent operation for the digital assistant 109 to perform.

Continuing with the example, the DSP 200, while operating in the follow-on query detection mode 220, determines that the follow-on audio data 127 corresponding to the follow-on query 129 includes voice activity and includes an utterance spoken by the same user 10a that submitted the initial query 117. Accordingly, the DSP 200 provides the follow-on event 215 and the follow-on audio data 127 to the second processor 300 configured to wake up the second processor 300 from the sleep state. Here, the determination by the follow-on query detection mode 220 indicating that voice activity is present in the follow-on audio data 127 and that the follow-on audio data 127 was spoken by the same speaker that spoke the initial query 117, provides a high likelihood that the follow-on audio data 127 includes the follow-on query 129. Thus, by leveraging the DSP 200 that consumes less power and computational resources than operating the second processor 300, the DSP 200 may function as a 'gate-keeper' to only trigger output of the follow-on event 215 to wake the second processor 300 from the sleep state in the event that the follow-on audio data 127 includes voice activity and was likely spoken by the same user 10a that spoke the initial query 117. Otherwise, the second processor 300 is permitted to operate in a sleep state after the response 192 to the initial query 117 is output to the user 10a.

Responsive to the follow-on event 215 waking up the second processor 300, the second processor 300 may execute the ASR model 310 to generate a speech recognition result 325 for the follow-on audio data 127. The second processor 300 may also execute the NLU module 320 to perform semantic interpretation on the speech recognition result 325 to identify the follow-on query 129 to submit to the digital assistant 109. In the example shown, the second processor 300 determines that the follow-on audio data 127 corresponds to the follow-on query 129 for "what about tomorrow?" and the assistant 109 retrieves a follow-on response 193 for the follow-on query 129. Here, the second processor 300 provides the follow-on response 193 from the assistant 109 as output from the AED 102 in the form of synthesized speech and/or text to indicate that "Tomorrow is going to be rainy with a high of 68-degrees."

Alternatively, the second processor 300 may determine that although the follow-on event 215 from the always-on DSP 200 indicated that the follow-on audio data 127 includes voice activity of the same user 10a that submitted the initial query 117, the follow-on audio data 127 is not directed towards the AED 102, and thus there is no follow-on query 129 for the digital assistant 109 to perform. In this scenario, the second processor 300 may provide an indication 307 that no follow-on query exists in the follow-on audio data 127 and return to the sleep state or remain in the awake state for a predetermined amount of time. In some examples, the second processor 300 prompts the user 10a to repeat the follow-on query 129 responsive to the indication 307 that no follow-on query 129 exists in the follow-on audio data 127.

As described above with reference to FIG. 1A, the ASR model 310 and NLU module 320 may be located on the remote system 110 in addition to, or in lieu, of the AED 102. Upon the DSP 200 triggering the second processor 300 to wake-up responsive to detecting the follow-on event 215, the second processor 300 may transmit the follow-on audio data 127 to the remote system 110 via the network 104. Here, the remote system 110 may execute the ASR model 310 to generate the speech recognition result 325 for the audio data 120. The remote system 110 may also execute the NLU module 320 to perform semantic interpretation on the speech recognition result 325 to identify the follow-on query 129 for the digital assistant 109 to perform the operation. Alternatively, the remote system 110 may transmit the speech recognition result 325 to the AED 102 and the AED 102 may execute the NLU module 320 to identify the follow-on query 129.

Figure 3A:
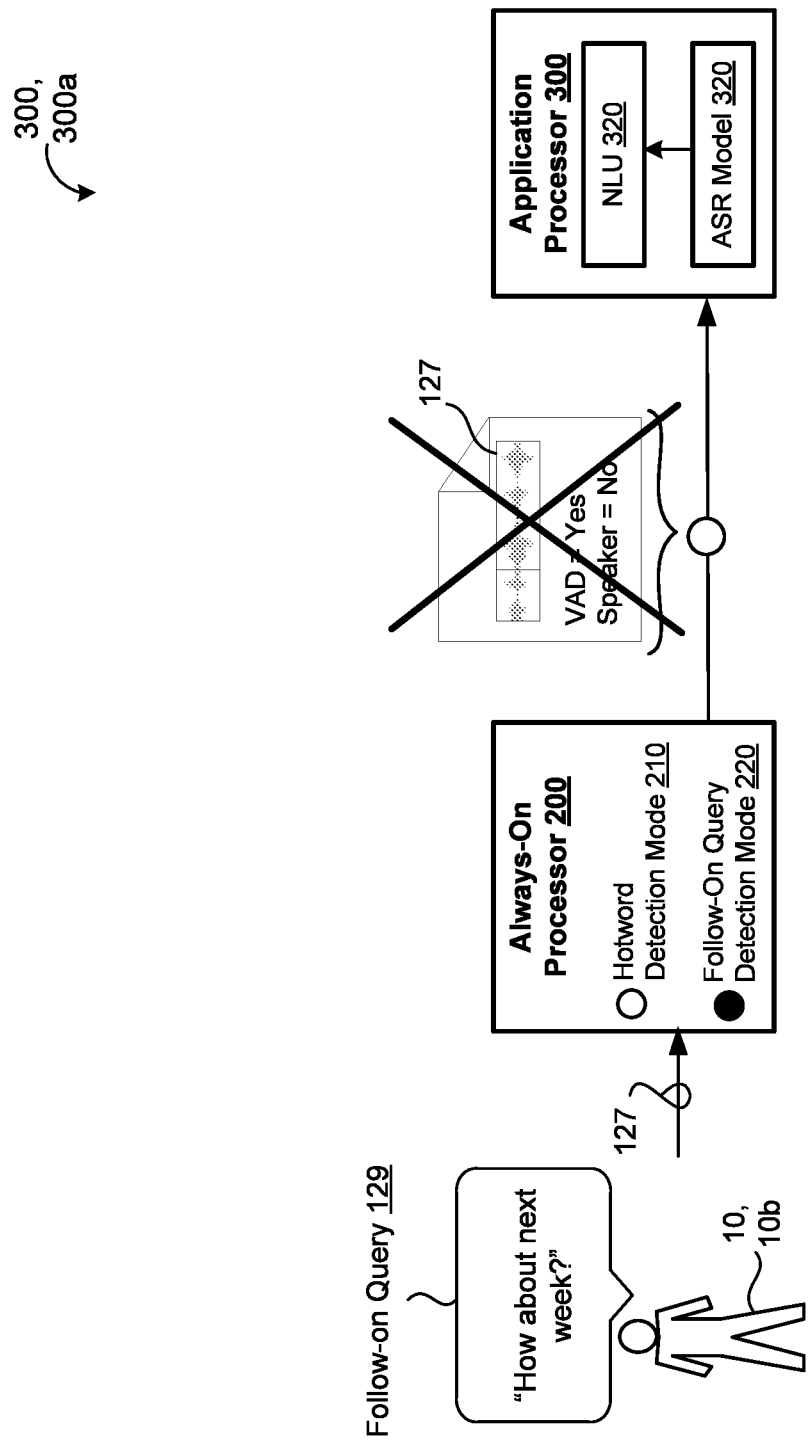
FIGS. 3A and 3B are schematic views of the digital signal processor of FIG. 2 determining there is no follow-on event in a follow-on query.
Figure 3B:
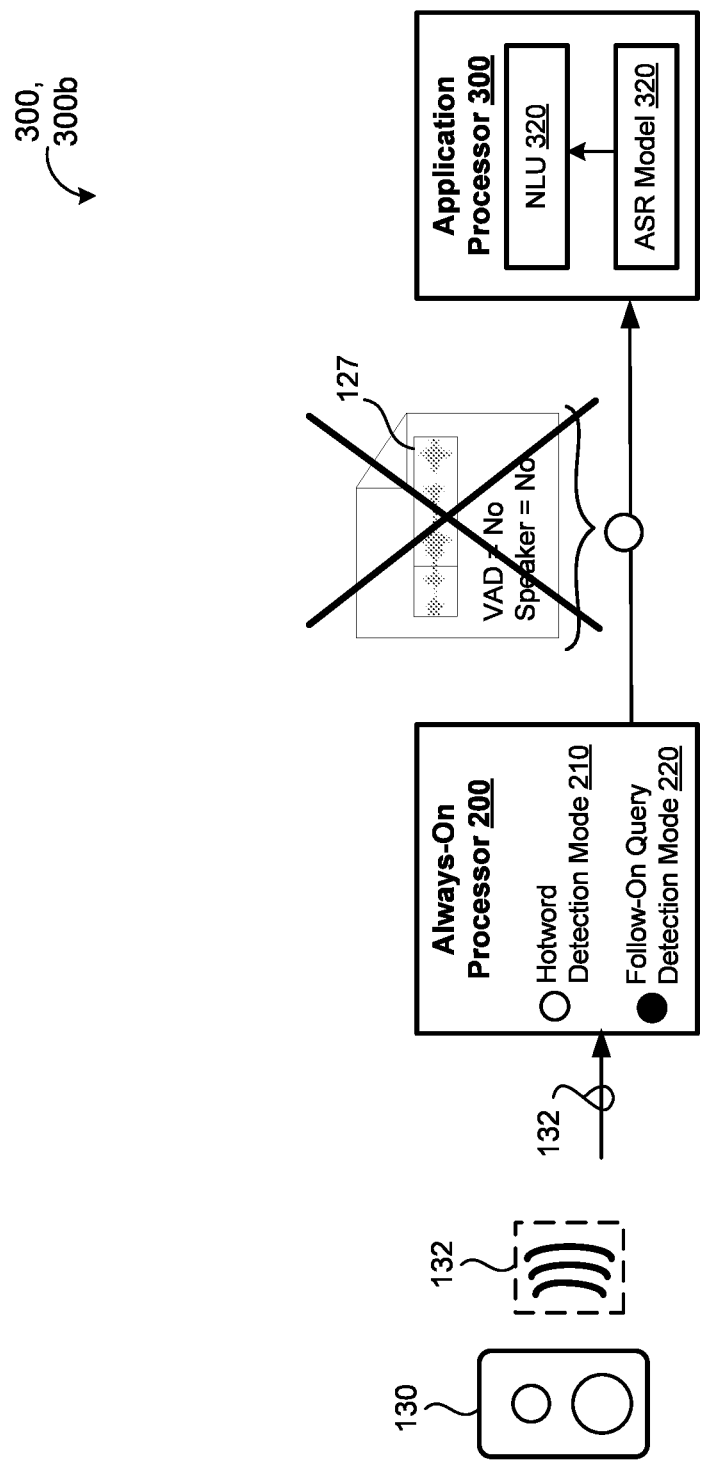

FIGS. 3A and 3B illustrate a speech environment 300 where the DSP 200 determines that there is no follow-on event 215 present in audio data received after the initial query 117 spoken by the user 10a. Referring now to FIGS. 2 and 3A, in a speech environment 300, 300b after receiving the response to the initial query submitted by the user 10a, the digital assistant instructs the DSP to operate in the follow-on query detection mode 220. Here, instructing the DSP 200 to operate in the follow-on detection mode 220 may cause the hotword detection mode 210 to disable and/or the second processor 300 to return to the sleep state. In the example shown, the DSP 200, while operating in the follow-on detection mode 220, receives follow-on audio data 127 corresponding to a follow-on query 129 of "How about next week?" spoken by a different user 10, 10b captured by the AED 102. Notably, the different user 10b that spoke the follow-on query 129 is different than the user 10a that spoke the initial query (FIG. 1A). Here, during operation of the follow-on query detection mode 220, the DSP 200 executes the VAD model 222 and determines that the follow-on audio data 127 includes voice activity. Even though the voice activity is from the different user 10b, the VAD model 222 indicates voice activity is present in the follow-on audio data 127. As such, the VAD 222 outputs a voice activity indication that denotes "Yes." The VAD model 222 detecting voice activity in the follow-on data 127 may cause a timeout period for operating in the follow-on detection mode 220 to reset or increase for executing the speaker verification process 400.

The DSP 200 also executes the speaker verification process 400 to determine a verification result 450 indicating whether the follow-on audio data 127 includes an utterance spoken by the same user 10a that submitted the initial query 117 (FIG. 1A). Here, the speaker verification process 400 determines the user 10b that spoke the follow-on query is not the same user as the user 10a that spoke the initial query. Therefore, the DSP 200 does not communicate the follow-on event 215 to the second processor 300, and thus, the second processor 300 remains in the sleep state. Moreover, if the DSP 200 does not detect a follow-on event 215 within a predetermined amount of time, the DSP 200 returns to the hotword detection mode 210.

Referring now to FIGS. 2 and 3B, in a speech environment 300, 300a after receiving the response to the initial query submitted by the user 10a, the digital assistant instructs the DSP to operate in the follow-on query detection mode 220. Here, instructing the DSP 200 to operate in the follow-on detection mode 220 may cause the hotword detection mode 210 to disable and/or the second processor 300 to return to the sleep state. In the example shown, the DSP 200, while operating in the follow-on detection mode 220, receives audio 132 from an audio source 130. The audio source 130 may be a television, stereo, speakers, or any other audio source. Here, during operation of the follow-on query detection mode 220, the DSP 200 executes the VAD model 222 and determines that the audio data 132 from the audio source 130 does not include voice activity. As such, the VAD 222 outputs a voice activity indication that denotes "No." The VAD 222 may output the voice activity indication of "No" after a timeout period of not detecting any voice activity in the audio data 132. Therefore, the DSP 200 does not communicate the follow-on event 215 to the second processor 300, and thus, the second processor 300 remains in the sleep state. Here, the DSP 200 may return to the hotword detection mode 210 and cease operation of the follow-on query detection mode 220 without ever executing the speaker verification process 400. That is, the DSP 200, returning to the hotword detection mode 210, may cease operation of the VAD 222 and the speaker verification process 400

Figure 4:
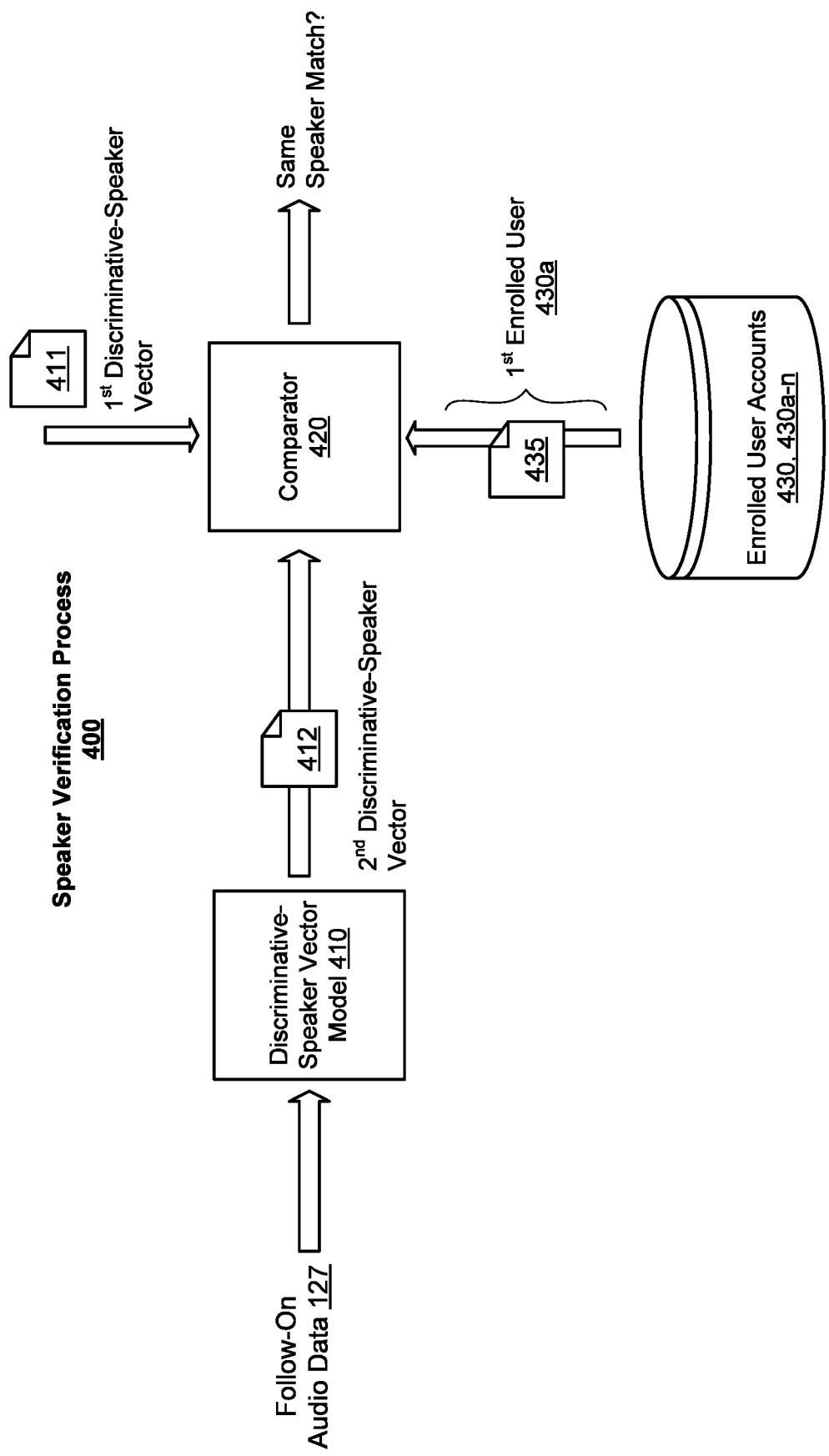
FIG. 4 is a schematic view of a speaker verification process.

Referring to FIG. 4, the DSP 200 executes the speaker verification process 400 to determine a verification result 450 indicating whether the follow-on audio data 127 of the follow-on query 129 (FIG. 1B) includes an utterance spoken by the same user 10 that submitted the initial query 117 (FIG. 1A). The DSP 200 or the AP 300 may extract a first speaker discriminative-speaker vector 411 from at least one of the first portion 121 of the audio data 120 characterizing the hotword 116 or the second portion 122 of the audio data 120 characterizing the initial query 117 spoken by the user 10a. Thereafter, and while the DSP 200 is in the follow-on query detection mode 220, the speaker verification process 400 identifies the user 10 that spoke the follow-on query by first extracting, from the follow-on audio data 127, a second discriminative-speaker vector 412 representing speech characteristics of the follow-on query. In some examples, the first and second discriminative-speaker vectors 411, 412 each include a respective set of speaker discriminative vectors associated with the user 10 that spoke the initial and follow-on queries.

The speaker verification process 400 may execute the speaker-discriminative model 410 configured to receive the follow-on audio data 127 as input and generate, as output, the second discriminative-speaker vector 412. The speaker-discriminative model 410 may be a neural network model trained under machine or human supervision to output second discriminative-speaker vectors 412. The second discriminative-speaker vector 412 output by the speaker-discriminative model 410 may include an N-dimensional vector having a value that corresponds to speech features of the follow-on query spoken by the user 10. In some examples, the second discriminative-speaker vector 412 is a d-vector. The speaker-discriminative model 410 may include a text-independent speaker identification model configured to extract a text-independent speaker-discriminative vector from the follow-on audio data 127. That is, the speaker-discriminative model 410 extracts speech characteristics for the speaker-discriminative vectors regardless of the content of the follow-on query represented by the follow-on audio data 127. The speaker-discriminative model 410 may similarly receive the initial audio data 120 as input and generate, as output, the first discriminative-speaker vector 411

Once the second discriminative-speaker vector 412 is output from the speaker-discriminative model 410, the speaker verification process 400 determines whether the second discriminative-speaker vector 412 matches the first speaker-discriminative vector 411 or a reference speaker vector 435 associated with the user 10a that spoke the initial query 117. The reference speaker vector 435 may be stored on the AED 102 (e.g., in memory hardware 105) and may be associated with an enrolled user account 430 from a plurality of enrolled user accounts 430a-n of the AED 102. That is, the AED 102 may have multiple different enrolled user accounts (i.e., enrolled users) 430 each having a respective reference speaker vector 435 corresponding to speech characteristics of the user associated with the enrolled user account 430. The user 10a that spoke the initial query 117 may be an enrolled user having a respective reference speaker vector 435. As such, the reference speaker vector 435 associated with the user 10a may be identified based on the first discriminative-speaker vector 411 extracted from the initial audio data 120. In additional examples, the reference speaker vector 435 associated with the user 10a is identified using other techniques.

The speaker-discriminative model 410 may generate the reference speaker vector 435 for each of the enrolled user accounts 430 during a voice enrollment process. For example, a user may speak multiple phrases such that the speaker-discriminative model 410 generates the reference speaker vector 435 representing speech characteristics of the user. In some examples, the reference speaker vector 435 is a more accurate representation of speech characteristics for a user as compared to the first discriminative-speaker vector 411. As such, utilizing the reference speaker vector 435 provides a more accurate estimate of whether the user that spoke the follow-on query matches the user that spoke the initial query.

Each reference speaker vector 435 may be used as a reference vector corresponding to a voiceprint of unique identifier representing characteristics of the voice of the respective user of the enrolled user account 430. Here, the comparator 420 may generate a score for the comparison indicating a likelihood that the follow-on query corresponds to the identity of the enrolled user account 430a associated with the user 10a that spoke the initial query 117, and the identity is accepted when the score satisfies a threshold. When the score does not satisfy the threshold, the comparator 420 may reject the identity. In some implementations, the comparator 420 computes a respective cosine distance between the second discriminative-speaker vector 412 and the reference speaker vector 435 associated with the first enrolled user account 430a and determines that the second discriminative-speaker vector 412 matches the reference speaker vector 435 when the respective cosine distance satisfies a cosine distance threshold. Alternatively, the comparator 420 may compute a respective cosine distance between the first and second discriminative-speaker vectors 411, 412 to determine whether or not a match exists.

When the speaker verification process 400 determines that the second discriminative-speaker vector 412 matches the reference speaker vector 435 associated with the first enrolled user account 430a, the speaker verification process 400 identifies the user 10 that spoke the follow-on query as the first enrolled user account 430a associated with the user 10a that spoke the initial query 117. In the example shown, the comparator 420 determines the match based on the respective cosine distance between the reference speaker vector 435 associated with first enrolled user account 430a and the second discriminative-speaker vector 412. When the speaker verification process 400 determines the user that spoke follow-on query 129 is the same user that spoke the initial query 117, the DSP 200 triggers output of the follow-on event 215 to cause the AP 300 to wake-up from the sleep state and process the follow-on query 129.

Conversely, when the speaker verification process 400 determines that the second discriminative-speaker vector 412 does not match either the reference speaker vector 435 or the first discriminative-speaker vector 411 associated with the user 10a that spoke the initial query 117, the speaker verification process 400 determines that the user 10 that spoke the follow-on query 127 is different than the user 10 that spoke the initial query 117. As such, the DSP 200 forgoes detection of the follow-on event and thereby permits the AP 300 to remain in the sleep-state.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
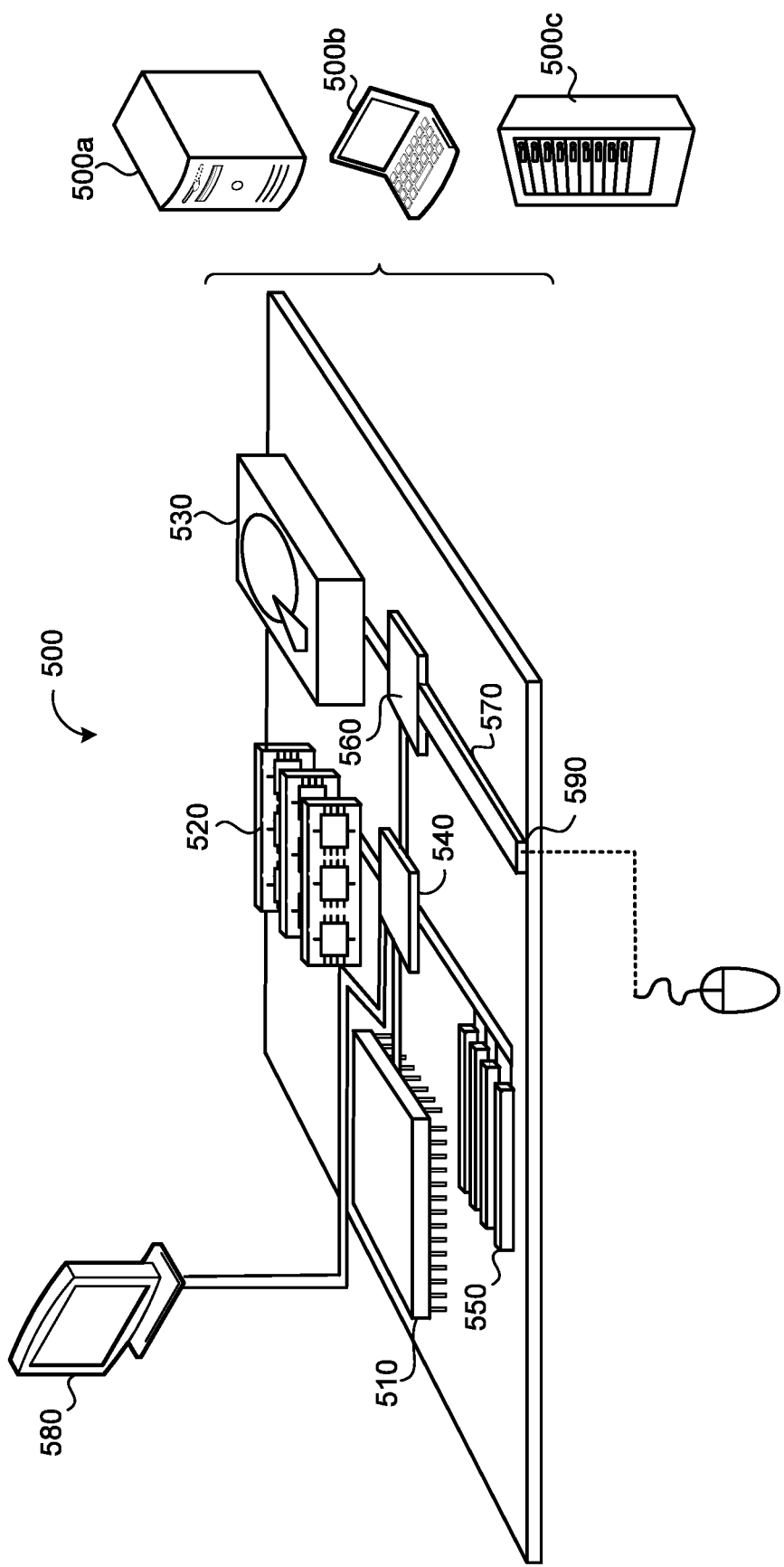
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Figure 6:
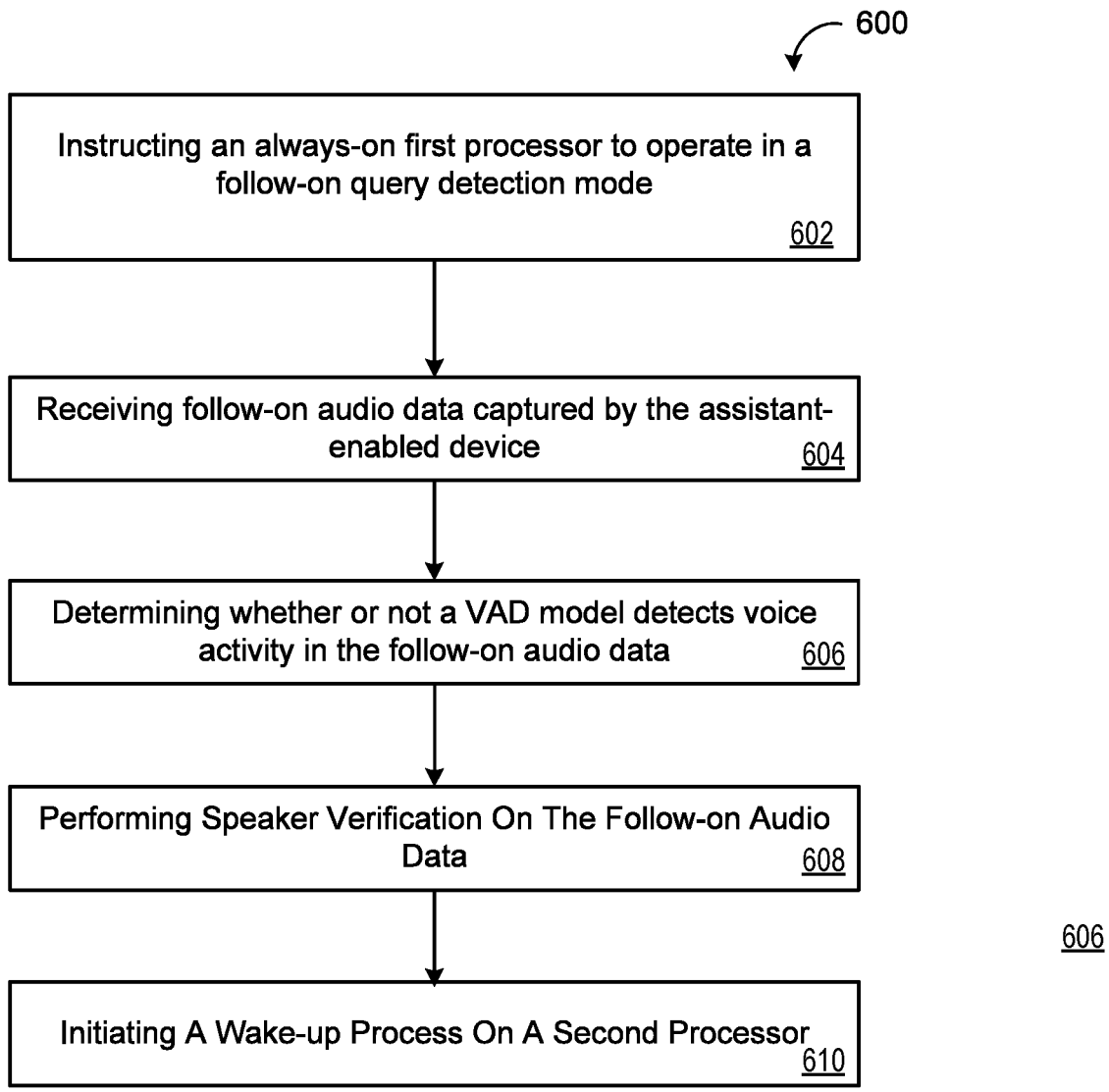
FIG. 6 is a flowchart of an example arrangement of operations for a method of detecting continued conversation in a speech-enabled environment.

FIG. 6 is a flowchart of an example arrangement of operations for a method 600 of detecting continued conversation in a speech-enabled environment. The method 600 may include a computer-implemented method that executes on the data processing hardware 103 of the assistant-enabled device 102. At operation 602, the method includes instructing an always-on first processor 200 of the data processing hardware 103 to operate in a follow-on query detection mode 220 in response to receiving a response 192 to an initial query 117 submitted by a user 10 of the assistant-enabled device 102 to a digital assistant 109. While the always-on first processor 200 operates in the follow-on query detection mode 220, the method 600 performs operations 604-610. At operation 604, the method 600 includes receiving, at the always-on first processor 200, follow-on audio data 215 captured by the assistant-enabled device 102 in an environment of the assistant-enabled device 102.

At operation 606, the method 600 includes determining, using a voice activity detection (VAD) model 222 executing on the always-on first processor 200, whether or not the VAD model 222 detects voice activity in the follow-on audio data 215. At operation 608, the method 600 includes performing, using a speaker identification (SID) model 400 executing on the always-on first processor 200, speaker verification on the follow-on audio data 215 to determine whether the follow-on audio data 215 includes an utterance spoken by the same user 10 that submitted the initial query 117 to the digital assistant 109. At operation 610, when the VAD model 222 detects voice activity in the follow-on audio data 215 and the follow-on audio data 215 includes the utterance spoken by the same user 10 that submitted the initial query 117, the method 600 also includes initiating a wake-up process on a second processor 300 of the data processing hardware 103 to determine whether the utterance includes a follow-on query 129 directed toward the digital assistant 109.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware of an assistant-enabled device causes the data processing hardware to perform operations comprising:
   in response to receiving a response to an initial query submitted by a user of the assistant-enabled device to a digital assistant, instructing an always-on first processor of the data processing hardware to operate in a follow-on query detection mode and an active second processor of the data processing hardware to return to a sleep state; and
   while the always-on first processor operates in the follow-on query detection mode:
      receiving, at the always-on first processor, follow-on audio data captured by the assistant-enabled device in an environment of the assistant-enabled device, the follow-on audio data not containing a hotword;
      determining, using a voice activity detection (VAD) model executing on the always-on first processor, whether or not the VAD model detects voice activity in the follow-on audio data;
      performing, using a speaker identification (SID) model executing on the always-on first processor, speaker verification on the follow-on audio data to determine whether the follow-on audio data comprises an utterance spoken by the same user that submitted the initial query to the digital assistant; and
      when the VAD model detects voice activity in the follow-on audio data and the follow-on audio data comprises the utterance spoken by the same user that submitted the initial query, initiating a wake-up process on a second processor of the data processing hardware to determine whether the utterance comprises a follow-on query directed toward the digital assistant.

2. The computer-implemented method of claim 1, wherein instructing the always-on first processor of the data processing hardware to operate in the follow-on query detection mode causes the always-on first processor to initiate execution of the VAD and SID models on the always-on first processor during operation in the follow-on query detection mode.

3. The computer-implemented method of claim 1, wherein instructing the always-on first processor of the data processing hardware to operate in the follow-on query detection mode causes the always-on first processor to disable a hotword detection model during operation in the follow-on query detection mode.

4. The computer-implemented method of claim 1, wherein initiating the wake-up process on the second processor causes the second processor to perform operations comprising:
   processing the follow-on audio data to generate a transcription of the utterance spoken by the same user that submitted the initial query; and
   performing query interpretation on the transcription to determine whether or not the utterance comprises the follow-on query directed toward the digital assistant.

5. The computer-implemented method of claim 4, wherein the operations further comprise, when the utterance comprises the follow-on query directed toward the digital assistant:
   instructing the digital assistant to perform an operation specified by the follow-on query;
   receiving, from the digital assistant, a follow-on response indicating performance of the operation specified by the follow-on query; and
   presenting, for output from the assistant-enabled device, the follow-on response.

6. The computer-implemented method of claim 1, wherein initiating the wake-up process on the second processor causes the second processor to transmit the follow-on audio data to a remote server via a network, the follow-on audio data when received by the remote server causing the remote server to perform operations comprising:
   processing the follow-on audio data to generate a transcription of the utterance spoken by the same user that submitted the initial query;
   performing query interpretation on the transcription to determine whether or not the utterance comprises the follow-on query directed toward the digital assistant; and
   when the utterance comprises the follow-on query directed toward the digital assistant, instructing the digital assistant to perform an operation specified by the follow-on query.

7. The computer-implemented method of claim 6, wherein the operations further comprise, after instructing the digital assistant to perform the operation specified by the follow-on query:
   receiving, from the digital assistant, a follow-on response indicating performance of the operation specified by the follow-on query; and
   presenting, for output from the assistant-enabled device, the follow-on response.

8. The computer-implemented method of claim 1, wherein the operations further comprise, after receiving initial audio data corresponding to the initial query spoken by the user and submitted to the digital assistant:
   extracting, from the initial audio data, a first speaker-discriminative vector representing characteristics of the initial query spoken by the user,
   wherein performing speaker verification on the follow-on audio data comprises:
      extracting, from the follow-on audio data, using the SID model, a second speaker-discriminative vector representing characteristics of the follow-on audio data; and
      determining that the follow-on audio data comprises the utterance spoken by the same user that submitted the initial query to the digital assistant when the first speaker-discriminative vector matches the second speaker-discriminative vector.

9. The computer-implemented method of claim 1, wherein the operations further comprise, after receiving initial audio data corresponding to the initial query spoken by the user and submitted to the digital assistant:
   extracting, from the initial audio data, a first speaker-discriminative vector representing characteristics of the initial query spoken by the user;
   determining whether the first speaker-discriminative vector matches any enrolled speaker vectors stored on the assistant-enabled device, each enrolled speaker vector associated with a different respective enrolled user of the assistant-enabled device; and when the first speaker-discriminative vector matches one of the enrolled speaker vectors, identifying the user that spoke the initial query as the respective enrolled user associated with the one of the enrolled speaker vectors that matches the first speaker-discriminative vector, wherein performing speaker verification on the follow-on audio data comprises:

extracting, from the follow-on audio data, using the SID model, a second speaker-discriminative vector representing characteristics of the follow-on audio data; and determining that the follow-on audio data comprises the utterance spoken by the same user that submitted the initial query to the digital assistant when the second speaker-discriminative vector matches the one of the enrolled speaker vectors associated with the respective enrolled user that spoke the initial query.

10. The computer-implemented method of claim 1, wherein the SID model comprises a text-independent SID model configured to extract a text-independent speaker-discriminative vector from the follow-on audio data.

11. The computer-implemented method of claim 1, wherein the operations further comprise, in response to determining at least one of the VAD model failing to detect voice activity in the follow-on audio data or the follow-on audio data fails to comprise an utterance spoken by the same user that submitted the initial query, instructing the always-on first processor to cease operating in the follow-on query detection mode and commence operating in a hotword detection mode.

12. The computer-implemented method of claim 11, wherein instructing the always-on first processor to cease operating in the follow-on query detection mode causes the always-on first processor to disable or deactivate execution of the VAD and SID models on the always-on first processor.

13. The computer-implemented method of claim 11, wherein instructing the always-on first processor to commence operating in the hotword detection mode causes the always-on first processor to initiate execution of a hotword detection model on the always-on first processor.

14. The computer-implemented method of claim 1, wherein:

the always-on first processor comprises a digital signal processor (DSP); and the second processor comprises an application processor.

15. The computer-implemented method of claim 1, wherein the assistant-enabled device comprises a battery-powered device in communication with one or more microphones configured to capture the follow-on audio data and initial audio data corresponding to the initial query.

16. An assistant-enabled device (AED) comprising:
data processing hardware; and
memory hardware in communication with the data processing hardware and storing instructions that when executed on the data processing hardware cause the data processing hardware to perform operations comprising:

in response to receiving a response to an initial query submitted by a user of the assistant-enabled device to a digital assistant, instructing an always-on first processor of the data processing hardware to operate in a follow-on query detection mode and an active second processor of the data processing hardware to return to a sleep state; and while the always-on first processor operates in the follow-on query detection mode:

receiving, at the always-on first processor, follow-on audio data captured by the assistant-enabled device in an environment of the assistant-enabled device, the follow-on audio data not containing a hotword;

determining, using a voice activity detection (VAD) model executing on the always-on first processor, whether or not the VAD model detects voice activity in the follow-on audio data;

performing, using a speaker identification (SID) model executing on the always-on first processor, speaker verification on the follow-on audio data to determine whether the follow-on audio data comprises an utterance spoken by the same user that submitted the initial query to the digital assistant; and when the VAD model detects voice activity in the follow-on audio data and the follow-on audio data comprises the utterance spoken by the same user that submitted the initial query, initiating a wake-up process on a second processor of the data processing hardware to determine whether the utterance comprises a follow-on query directed toward the digital assistant.

17. The AED of claim 16, wherein instructing the always-on first processor of the data processing hardware to operate in the follow-on query detection mode causes the always-on first processor to initiate execution of the VAD and SID models on the always-on first processor during operation in the follow-on query detection mode.

18. The AED of claim 16, wherein instructing the always-on first processor of the data processing hardware to operate in the follow-on query detection mode causes the always-on first processor to disable a hotword detection model during operation in the follow-on query detection mode.

19. The AED of claim 16, wherein initiating the wake-up process on the second processor causes the second processor to perform operations comprising:

processing the follow-on audio data to generate a transcription of the utterance spoken by the same user that submitted the initial query; and performing query interpretation on the transcription to determine whether or not the utterance comprises the follow-on query directed toward the digital assistant.

20. The AED of claim 19, wherein the operations further comprise, when the utterance comprises the follow-on query directed toward the digital assistant:

instructing the digital assistant to perform an operation specified by the follow-on query;

receiving, from the digital assistant, a follow-on response indicating performance of the operation specified by the follow-on query; and presenting, for output from the assistant-enabled device, the follow-on response.

21. The AED of claim 16, wherein initiating the wake-up process on the second processor causes the second processor to transmit the follow-on audio data to a remote server via a network, the follow-on audio data when received by the remote server causing the remote server to perform operations comprising:

processing the follow-on audio data to generate a transcription of the utterance spoken by the same user that submitted the initial query;

performing query interpretation on the transcription to determine whether or not the utterance comprises the follow-on query directed toward the digital assistant; and when the utterance comprises the follow-on query directed toward the digital assistant, instructing the digital assistant to perform an operation specified by the follow-on query.

22. The AED of claim 21, wherein the operations further comprise, after instructing the digital assistant to perform the operation specified by the follow-on query:
receiving, from the digital assistant, a follow-on response indicating performance of the operation specified by the follow-on query; and
presenting, for output from the assistant-enabled device, the follow-on response.

23. The AED of claim 16, wherein the operations further comprise, after receiving initial audio data corresponding to the initial query spoken by the user and submitted to the digital assistant:
extracting, from the initial audio data, a first speaker-discriminative vector representing characteristics of the initial query spoken by the user,
wherein performing speaker verification on the follow-on audio data comprises:
extracting, from the follow-on audio data, using the SID model, a second speaker-discriminative vector representing characteristics of the follow-on audio data; and
determining that the follow-on audio data comprises the utterance spoken by the same user that submitted the initial query to the digital assistant when the first speaker-discriminative vector matches the second speaker-discriminative vector.

24. The AED of claim 16, wherein the operations further comprise, after receiving initial audio data corresponding to the initial query spoken by the user and submitted to the digital assistant:
extracting, from the initial audio data, a first speaker-discriminative vector representing characteristics of the initial query spoken by the user;
determining whether the first speaker-discriminative vector matches any enrolled speaker vectors stored on the assistant-enabled device, each enrolled speaker vector associated with a different respective enrolled user of the assistant-enabled device; and
when the first speaker-discriminative vector matches one of the enrolled speaker vectors, identifying the user that spoke the initial query as the respective enrolled user associated with the one of the enrolled speaker vectors that matches the first speaker-discriminative vector,
wherein performing speaker verification on the follow-on audio data comprises:
extracting, from the follow-on audio data, using the SID model, a second speaker-discriminative vector representing characteristics of the follow-on audio data; and
determining that the follow-on audio data comprises the utterance spoken by the same user that submitted the initial query to the digital assistant when the second speaker-discriminative vector matches the one of the enrolled speaker vectors associated with the respective enrolled user that spoke the initial query.

25. The AED of claim 16, wherein the SID model comprises a text-independent SID model configured to extract a text-independent speaker-discriminative vector from the follow-on audio data.

26. The AED of claim 16, wherein the operations further comprise, in response to determining at least one of the VAD model failing to detect voice activity in the follow-on audio data or the follow-on audio data fails to comprise an utterance spoken by the same user that submitted the initial query, instructing the always-on first processor to cease operating in the follow-on query detection mode and commence operating in a hotword detection mode.

27. The AED of claim 26, wherein instructing the always-on first processor to cease operating in the follow-on query detection mode causes the always-on first processor to disable or deactivate execution of the VAD and SID models on the always-on first processor.

28. The AED of claim 26, wherein instructing the always-on first processor to commence operating in the hotword detection mode causes the always-on first processor to initiate execution of a hotword detection model on the always-on first processor.

29. The AED of claim 16, wherein:
the always-on first processor comprises a digital signal processor (DSP); and
the second processor comprises an application processor.

30. The AED of claim 16, wherein the assistant-enabled device comprises a battery-powered device in communication with one or more microphones configured to capture the follow-on audio data and initial audio data corresponding to the initial query.

* * * * *